United States Patent
Ackermann et al.

(10) Patent No.: US 12,068,709 B2
(45) Date of Patent: Aug. 20, 2024

(54) ELECTRICAL CIRCUIT ARRANGEMENT AND DRIVE ARRANGEMENT FOR DRIVING A MOTOR VEHICLE

(71) Applicant: Schaeffler Technologies AG & Co. KG, Herzogenaurach (DE)

(72) Inventors: Sebastian Ackermann, Offenburg (DE); Patrick Augustin, Bühl (DE); Vincent Leonhardt, Haguenau (FR); Denis Muller, Batzendorf (FR); Eduard Enderle, Gengenbach (DE)

(73) Assignee: Schaeffler Technologies AG & CO. KG, Herzogenaurach (DE)

( * ) Notice: Subject to any disclaimer, the term of this patent is extended or adjusted under 35 U.S.C. 154(b) by 5 days.

(21) Appl. No.: 17/927,568

(22) PCT Filed: Apr. 14, 2021

(86) PCT No.: PCT/DE2021/100342
§ 371 (c)(1),
(2) Date: Mar. 20, 2023

(87) PCT Pub. No.: WO2021/239173
PCT Pub. Date: Dec. 2, 2021

(65) Prior Publication Data
US 2024/0072714 A1    Feb. 29, 2024

(30) Foreign Application Priority Data
May 28, 2020   (DE) .................... 10 2020 114 283.8

(51) Int. Cl.
*H02P 29/024*    (2016.01)
*B60L 15/00*    (2006.01)
*H02P 27/06*    (2006.01)

(52) U.S. Cl.
CPC .......... *H02P 29/024* (2013.01); *B60L 15/007* (2013.01); *H02P 27/06* (2013.01); *B60L 2210/40* (2013.01)

(58) Field of Classification Search
CPC ..................................................... B60L 15/007
See application file for complete search history.

(56) References Cited

U.S. PATENT DOCUMENTS 3,683,264 A     8/1972 Schieman et al.
2002/0079944 A1* 6/2002 Sander ............... H03K 17/0822
                                                  327/309

(Continued)

FOREIGN PATENT DOCUMENTS

DE         10218070 A1    5/2003
DE    112017000331 T5    11/2018

(Continued)

OTHER PUBLICATIONS

Author: Wikipedia Title: AND gate Date: Apr. 14, 2020 Country: United States Wikimedia Foundation; https://en.wikipedia.org/w/index.php?title=AND_gate&oldid=950997412.

(Continued)

*Primary Examiner* — Daniel Kessie

(57) ABSTRACT

An electrical circuit arrangement includes an inverter, a driver circuit and a protective circuit. The inverter includes a plurality of inverter switching elements each having a drive connection. The drive connection of at least one inverter switching element is connected to the driver circuit via a first switching element of the protective circuit (6). A drive connection of the first switching element is connected to a circuit node, which is connected to a first potential via a resistor and to a second potential via a second switching element. The protective circuit comprises a comparison device, an input of which is connected to an operating voltage and a reference voltage and an output of which is (Continued)

connected to a drive connection of the second switching element so that, if the operating voltage deviates from the reference voltage, the second switching element is switched and the first switching element is switched due to one of the first potential or the second potential being applied to the circuit node as a result of the switching of the second switching element.

20 Claims, 2 Drawing Sheets

(56) References Cited

U.S. PATENT DOCUMENTS

| | | | | |
|---|---|---|---|---|
| 2003/0052621 A1* | 3/2003 | Konopka | ........... | H05B 41/2851 315/225 |
| 2008/0304189 A1 | 12/2008 | Tang et al. | | |
| 2009/0097180 A1* | 4/2009 | Feng | ................. | H05B 41/2855 361/91.1 |
| 2011/0317315 A1 | 12/2011 | Motohashi et al. | | |
| 2021/0359633 A1* | 11/2021 | Kato | ....................... | F04D 25/06 |
| 2022/0029409 A1* | 1/2022 | Kato | ....................... | H02H 7/122 |
| 2022/0073131 A1* | 3/2022 | Loecher | .................. | H02P 27/06 |

FOREIGN PATENT DOCUMENTS

| | | |
|---|---|---|
| DE | 112018006429 T5 | 9/2020 |
| WO | 2019123716 A1 | 2/2020 |

OTHER PUBLICATIONS

Author: Wikipedia Title: Electric vehicle Date: May 27, 2020 Country: United States Wikimedia Foundation; https://en.wikipedia.org/w/index.php?title=Electric_vehicle&oldid=959147371.

* cited by examiner

ELECTRICAL CIRCUIT ARRANGEMENT AND DRIVE ARRANGEMENT FOR DRIVING A MOTOR VEHICLE

CROSS-REFERENCE TO RELATED APPLICATIONS

This application is the U.S. National Phase of PCT Appln. No. PCT/DE2021/100342 filed Apr. 14, 2021, which claims priority to DE 102020114283.8 filed May 28, 2020, the entire disclosures of which are incorporated by reference herein.

TECHNICAL FIELD

The disclosure relates to an electrical circuit arrangement comprising an inverter, a driver circuit and a protective circuit, wherein the inverter comprises a plurality of inverter switching elements, each having a drive connection. Furthermore, the disclosure relates to a drive arrangement for driving a motor vehicle.

BACKGROUND

To drive a motor vehicle, electric machines are used, for example, which are operated with an alternating current provided via an inverter. The inverter can be used to convert a direct current taken from a direct current source, for example a vehicle battery, into an alternating current for operating the electric machine. For this purpose, the switching elements of the inverter can be controlled by a driver circuit. In motor vehicles, as well as in other applications, it is desirable for safety reasons if a safe state of the electric machine and/or the inverter can be achieved when a fault occurs, in order in particular to avoid an undesired operating state of the electric machine. For this purpose, it is known to use computing devices set up to monitor the function of the inverter and/or the electric machine, in which various safety functions are implemented via software. However, computing devices of this type that are equipped with safety functions are cost-intensive and, under certain circumstances, limit the design freedom that is available for designing the further components.

SUMMARY

The present disclosure, according to an exemplary embodiment, provides an improved electrical circuit arrangement which, in particular, offers a protective function that is easy to implement.

An electrical circuit arrangement provides that at least one drive connection of an inverter switching element is connected to the driver circuit via a first switching element of a protective circuit, wherein a drive connection of the first switching element is connected to a circuit node which is connected via a resistor to a first potential and via a second switching element to a second potential, wherein the protective circuit comprises a comparison device, the input of which is connected to an operating voltage and a reference voltage and the output of which is connected to a drive connection of the second switching element, so that if the operating voltage deviates from the reference voltage, the second switching element is switched and the first switching element is opened due to the potential applied to the circuit node as a result of said switching.

The driver circuit is connected to the inverter in such a way that at least one drive connection of one of the inverter switching elements is connected to the driver circuit via the first switching element. As a result, the driver circuit can be separated from the drive connection of the inverter switching element by opening the first switching element, so that when the first switching element is opened when there is a deviation between the operating voltage and the reference voltage that represents a fault situation, the connection between the driver circuit and the inverter circuit is interrupted. In the event of a fault, this avoids undesired activation of the inverter or the inverter switching elements by the driver circuit. In particular, a safe state of the inverter and an electric machine connected to the inverter is achieved even if there is a defect in the driver circuit and/or a defect in a control device connected to the driver circuit.

By using the comparison device, which compares an operating voltage with a reference voltage and which switches the second switching element when the operating voltage deviates from the reference voltage, in particular when the operating voltage exceeds the reference voltage, so that the first switching element is opened after the switching of the second switching element at the potential applied on the circuit node, this advantageously creates a protective circuit that can be implemented simply and in particular only by analog components. The use of complex computing devices for fault monitoring and/or software-based safety functions can thus advantageously be dispensed with.

The circuit node is connected to the first potential via a resistor, wherein the first potential is also applied at the circuit node when the second switching element is open, for example, i.e., it is in a state in which the operating voltage corresponds at least substantially to the reference voltage or, for example, falls below it. This first potential, which is connected by the connection of the circuit node to the drive connection of the at least one first switching element, causes the first switching element to be closed in this state, for example, so that the connection between the driver circuit and the at least one drive connection of at least one of the inverter switching elements exists and operation of all inverter switching elements of the inverter is possible through the driver circuit.

If the operating voltage deviates from the reference voltage, in particular if the reference voltage is exceeded by the operating voltage, the second switching element is switched to be conductive, for example, by the comparison device, so that a connection is created between the circuit node and the second potential, which due to the resistance switched between the first potential and the circuit node is also applied at the circuit node due to the closing of the second switching element. As a result of the connection of the circuit node to the drive connection of the at least one first switching element, the second potential is then also applied at the drive connection of the first switching element, wherein the second potential causes the first switching element to be opened and at least one drive connection of an inverter switching element to be separated from the driver circuit. In this case, the first potential can be, for example, a positive potential and the second potential can be a ground potential. The first switching element can be designed as a transistor, in particular as a normally blocking n-channel field effect transistor. The comparison device can in particular be designed in such a way that if the operating voltage deviates from the reference voltage, a positive potential in particular is present at its output, so that switching of a second switching element, which is for example also designed as a normally blocking n-channel field effect transistor, is possible accordingly.

According to the present disclosure, it can be provided that the circuit node is connected to a drive connection of a third switching element, wherein the third switching element connects the first potential to the drive connection of the inverter switching element. The drive connection of the third switching element is connected to the circuit node and thus to the first potential via the resistor. The switchable path of the third switching element, for example a drain-source path, is connected with one connection, in particular directly, to the first potential and with the second connection to the drive connection of the inverter. The connection between the third switching element and the drive connection of the at least one inverter switching element is such that this connection is not interrupted after the first switching element opens; therefore, the third switching element between the first switching element and the drive connection of the inverter is connected with the drive connection of the inverter.

The provision of the third switching element means that when the second switching element is switched by closing the third switching element, the first potential is connected to the drive connection of the inverter switching element, as a result of which a defined switching state of the inverter switching element can be set. This occurs in particular independently of the driver circuit, which in this case is no longer connected to the drive connection of the inverter switching element due to the opening of the first switching element.

In an exemplary embodiment of the present disclosure, it can be provided that the application of the first potential to the drive connection of the inverter switching element causes the inverter switching element to close. Thus, if the operating voltage deviates from the reference voltage, a defined state of the inverter switching element, namely a conductive state, can be set in addition to a disconnection of at least one drive connection of an inverter switching element. In particular, this allows voltages induced by continued operation of the electric machine to be discharged in a targeted manner in the case of an inverter connected to an electric machine.

In an exemplary embodiment of the present disclosure, it is provided that the inverter comprises a plurality of half-bridges, wherein each of the half-bridges comprises an inverter switching element as a high-side switch and an inverter switching element as a low-side switch, wherein the drive connections of the low-side switches are each connected, via the first switching element, to the driver circuit, wherein the drive connections of the first switching elements are connected to the circuit node. In particular, the inverter can be a three-phase inverter and can comprise three half-bridges, wherein each half-bridge comprises a high-side switch and a low-side switch. Connecting all three low-side switches to the driver circuit via a respective first switching element makes it possible to separate the driver circuit from all three low-side switches when the deviation between the operating voltage and the reference voltage occurs.

Furthermore, it can be provided that a third switching element that may be present is connected to the connections of several, in particular all, low-side switches, so that after the low-side switches have been disconnected from the driver circuit via the third switching element, a defined state of the low-side switches, in particular a closed state of the low side switch, can be set. The conductive switching, in particular of all low-side switches of the inverter, makes it possible for a voltage generated or induced by continued operation of an electric machine connected to the inverter to prevent any further increase in the operating voltage and thus no damage is caused to the electrical circuit arrangement or to other components connected to the electrical circuit arrangement.

In an exemplary embodiment of the present disclosure, it can be provided that the comparison device is a comparator. The comparator makes it very easy to determine whether the operating voltage deviates from the reference voltage, in particular whether the operating voltage exceeds the reference voltage, wherein a high potential is present at the output of the comparator, for example, if the reference voltage is exceeded by the operating voltage. In normal operating states, in which the operating voltage does not exceed the reference voltage, a low voltage potential, for example a ground potential, can be applied at the output of the comparator. This makes it possible for the second switching element to be able to be switched via the output of the comparator, for example the second switching element can be switched to be conductive if the operating voltage deviates from the reference voltage. Furthermore, the comparator can be designed as an analog component, so that a protective function is advantageously made possible without the use of computing devices and/or software.

According to the present disclosure, it can be provided that the output of the comparison device is connected to a switch-off connection of the driver circuit. The switch-off connection of the driver circuit can in particular be designed in such a way that when the potential at the output of the comparison device is applied to the switch-off connection when the operating voltage deviates from the reference voltage, a function of the driver circuit is switched off, i.e., there is no further activation of the inverter or the inverter switching elements by the driver circuit. The drive connection is advantageously designed such that when a high potential is applied to the output of a comparison device designed as a comparator, or when the reference voltage is exceeded by the operating voltage, the switch-off connection is activated and the driver circuit is therefore deactivated or switched off.

According to the present disclosure, it can be provided that the operating voltage is a DC voltage connected to a DC voltage side of the inverter. The monitoring of this operating voltage by means of the protective circuit ensures that the electrical circuit arrangement is not damaged in the event of an undesired increase in this operating voltage, for example as a result of an error which has occurred or the like. The operating voltage can be a DC voltage between 12 V and 60 V, in particular a DC voltage of 48 V.

For a drive arrangement according to the present disclosure for driving a motor vehicle, it is provided that it comprises an electric drive machine and an electric circuit arrangement according to the present disclosure, wherein the inverter of the electric circuit arrangement is connected to the electric drive machine. The electric drive machine can in particular be designed in such a way that a motor vehicle can be moved at least temporarily with it. For this purpose, the inverter can, for example, be connectable or connected to a direct current source such as a battery, so that direct current drawn from the battery can be drawn by the inverter to operate the electric drive machine.

All the advantages and configurations of the present disclosure described above in relation to the electrical circuit arrangement apply correspondingly to the drive arrangement according to the present disclosure.

BRIEF DESCRIPTION OF THE DRAWINGS

The present disclosure is explained below using exemplary embodiments with reference to the drawings. The drawings are schematic representations in which.

DETAILED DESCRIPTION

Figure 1:
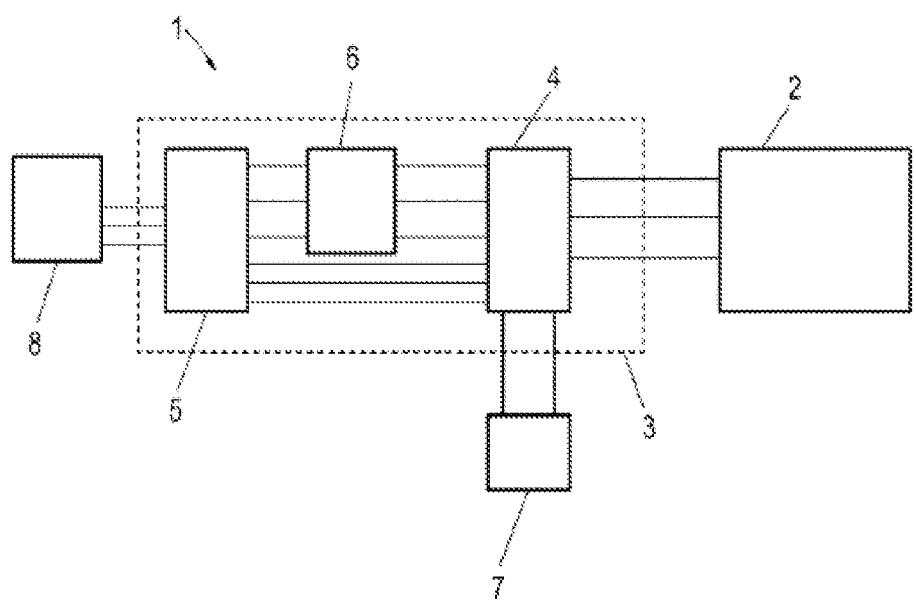
FIG. 1 shows an exemplary embodiment of a drive assembly according to the present disclosure.

FIG. 1 shows an exemplary embodiment of a drive arrangement 1 according to the present disclosure for driving a motor vehicle. The drive arrangement 1 comprises an electric drive machine 2 and an electrical circuit arrangement 3. The electrical circuit arrangement 3 comprises an inverter 4, a driver circuit 5 and a protective circuit 6. In this case, the driver circuit 5 is connected to the protective circuit 6 and the inverter 4.

The inverter 4 can be operated via the driver circuit 5, so that the inverter 4 can convert, for example, a direct current provided by a DC voltage source 7, for example a battery, connected to the inverter 4 into an alternating current for operating the electric machine 2. The driver circuit 5 can in turn be connected to a control unit 8 which, for example when the drive system 1 is operating in a motor vehicle, receives operating points to be set for the electric drive machine 2 and implements these, for example as part of a regulation, by a corresponding activation of the driver circuit 5 and thus the inverter 4. The structure of the electrical circuit arrangement 3 is explained in more detail below.

Figure 2:
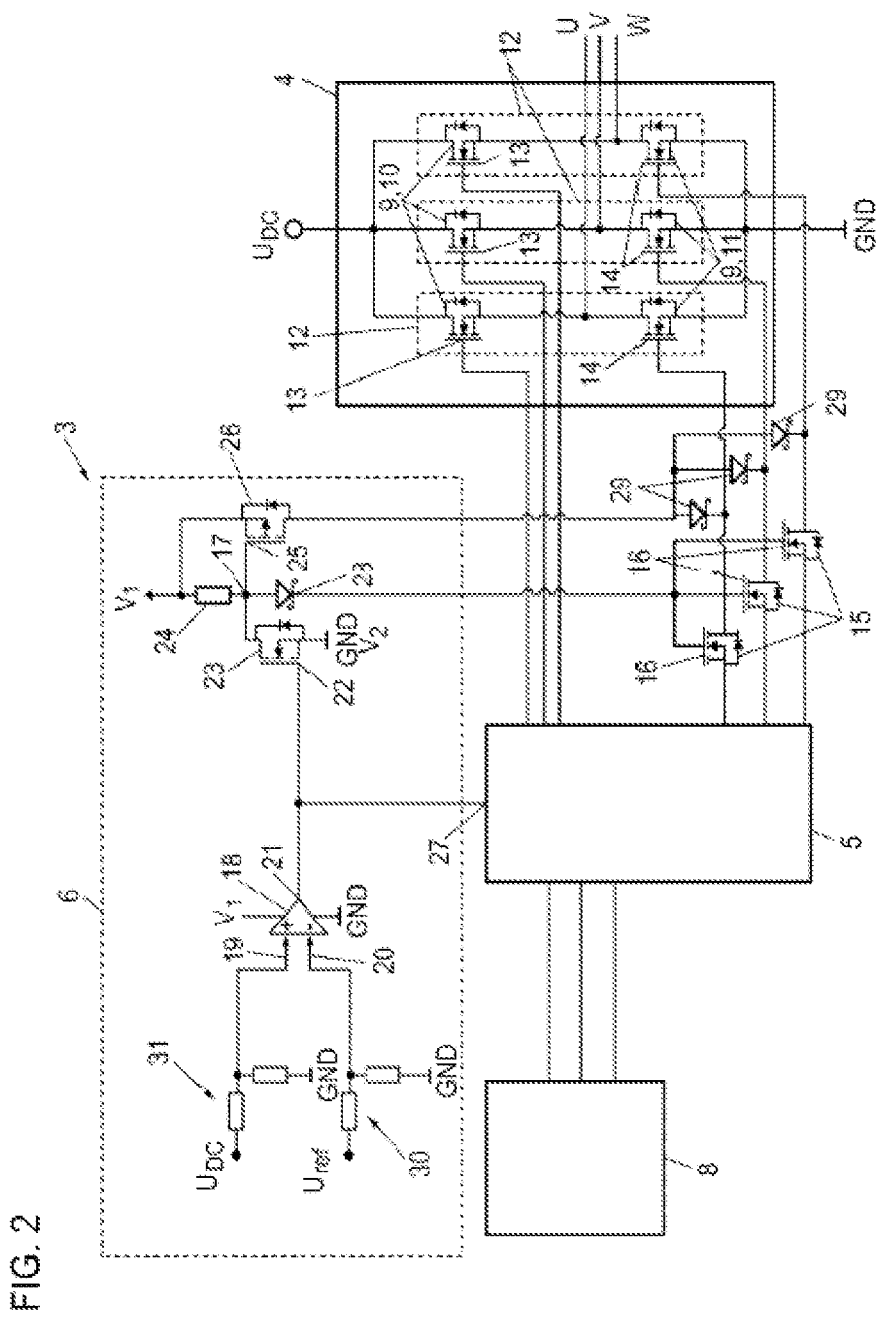
FIG. 2 shows an exemplary embodiment of an electrical circuit arrangement according to the present disclosure.

FIG. 2 shows an exemplary embodiment of an electrical circuit arrangement 3 according to the present disclosure. As can be seen, the inverter 4 in this exemplary embodiment comprises six inverter switching elements 9, wherein three of the inverter switching elements 9 each form a high-side switch 10 and the other three each form a low-side switch 11, in each one of three half-bridges 12 of the inverter 4. The bridge points of the half bridges 12 are connected or connectable to the phases U, V and W of the electric machine 2. The inverter 4 is operated by a DC voltage $U_{DC}$, which can be provided by the direct current source 7, as shown in FIG. 1, for example.

The inverter switching elements 9, which are embodied, for example, as bipolar transistors with an insulating gate (IGBTs) or as metal-oxide-semiconductor field-effect transistors (MOSFETs), each comprise a drive connection 13 or 14, embodied as a gate connection, for example. The drive connections 13 of the high-side transistors 10 are connected directly to the driver circuit 5, whereas the drive connections 14 of the low-side transistors 11 are each connected to the driver circuit 5 via a first switching element 15 of the protective circuit 6. The drive connections 16 of the first switching elements 15 are connected to a circuit node 17.

The protective circuit 6 also comprises a comparison device 18, which is designed as an analog comparator. A first input-side connection 19 of the comparator is connected to the operating voltage $U_{DC}$, wherein a second input-side connection 20 of the comparator is connected to a reference voltage $U_{REF}$. The comparator is also connected to a voltage potential $V_K$ and to ground (GND). If the operating voltage $U_{DC}$ is less than the reference voltage $U_{REF}$, the low potential, in the present exemplary embodiment the ground potential, is applied at the output of the comparator. Correspondingly, the potential $V_K$ is applied at the output 21 of the comparator when the operating voltage $U_{DC}$ is greater than the reference voltage $U_{REF}$. The output 21 of the comparator is connected to a drive connection 22 of a second switching element 23.

The circuit node 17 is connected to a first potential $V_1$ via a resistor 24 and to a second potential $V_2$ via the second switching element 23 or via the switchable drain-source path of the second switching element 23, which in the present exemplary embodiment is a ground potential. Furthermore, the circuit node 17 is connected to a drive connection 25 of a third switching element 26.

The output 21 of the comparator 18 is connected to a switch-off connection 27 of the driver circuit 5. If the operating voltage $U_{DC}$ is less than the reference voltage $U_{REF}$, the ground potential is applied at the output 21 of the comparator 18 and the second switching element 23 is switched to the blocking state. As a result, the first potential $V_1$ is present at the circuit node 17, which potential is also present at the drive connections 16 of the first switching elements 15 and causes the first switching elements 15 to be closed or switched to be conductive. In this state, the inverter switching elements 9 can be driven by the driver circuit 5.

If the operating voltage $U_{DC}$ exceeds the reference voltage $U_{REF}$, the potential $V_K$ is present at the output 21 of the comparator 18. Due to the connection with the switch-off connection 27 of the driver circuit 5, this is also applied at the switch-off connection 27 of the driver circuit 5 and causes the driver circuit 5 to be switched off or the driver circuit 5 to not activate the inverter switching elements 9 of the inverter 4.

Furthermore, the potential $V_K$ present at the drive connection 22 of the second switching element 23 causes the second switching element 23 to be switched to be conductive, so that the potential $V_2$, in this case a ground potential, is present at the circuit node 17. Due to the connection of the circuit node 17 to the drive connections 16 of the first switching elements 15, the potential $V_2$ is also applied at the first drive connections 16 and causes the first switching elements 15 to be opened or switched to blocking. Furthermore, the potential $V_2$ present at the circuit node 17 causes the third switching element 26 to be switched to be conductive, so that the first potential $V_1$ is present at the drive connections 14 of the low-side switches 11 of the inverter 4. The potential $V_1$ has the effect that the low-side switches 11 are each switched to be conductive, so that an electric drive motor connected, for example, to the phases U, V, W cannot generate any further increase in the operating voltage $U_{DC}$, for example through induction or the like.

The potential $V_1$ is a positive potential which is greater than the potential $V_2$ or greater than the ground potential. The potential $V_K$ is also a positive potential, which can correspond in particular to the potential $V_1$. The first switching elements 15 and the second switching element 23 are designed as normally blocking n-channel field effect transistors. The third switching element 26 is designed as a normally blocking p-channel field effect transistor, so that it is switched to be conductive when the potential $V_2$ or the ground potential is present at the drive connection 25. It is also possible that potentials $V_1$, $V_2$ and/or $V_K$ with other polarities are used or that potentials different from a ground potential are used instead of the ground potential shown in each case. Correspondingly, other types of switching elements can also be used for the first switching elements 15, the second switching element 23 and the third switching element 25, which correspondingly fulfill the functions described above, even with other potentials.

A diode 28 is connected between the circuit node 17 and the drive connections 16 of the first switching elements 15 in order to avoid unwanted feedback. Correspondingly, a diode 29 is respectively arranged between the drive connections 14 and the second switching element 26. The diodes 28 and 29 can be designed as Schottky diodes, for example. The first switching elements 15, the second switching element 23 and the third switching element 26 also each comprise a freewheeling diode. The operating voltage $U_{DC}$ is, in particular, a DC voltage with a voltage between 12 V and 60 V, in particular a voltage of 48 V, which is accordingly also present on a direct current side of the inverter 4. The operating voltage $U_{DC}$ and the reference voltage $U_{ref}$ can each be applied directly or via a voltage divider 30 or 31 formed from two resistors to the connections 19 or 20 of the comparison device.

LIST OF REFERENCE SYMBOLS

1 Drive arrangement
2 Drive machine
3 Electrical circuit arrangement
4 Inverter
5 Driver circuit
6 Protective circuit
7 DC voltage source
8 Control device
9 Inverter switching element
10 High-side switch
11 Low-side switch
12 Half-bridge
13 Drive connection
14 Drive connection
15 First switching element
16 Drive connection
17 Circuit node
18 Comparator
19 First input
20 Second input
21 Output
22 Drive connection
23 Second switching element
24 Resistor
25 Drive connection
26 Third switching element
27 Switch-off connection
28 Diode
29 Diode
30 Voltage divider
31 Voltage divider
V1 First potential
V2 Second potential
$U_{DC}$ Operating voltage
$U_{REF}$ Reference voltage
U, V, W Phase

The invention claimed is:

1. An electrical circuit arrangement comprising an inverter, a driver circuit and a protective circuit, wherein the inverter includes a plurality of inverter switching elements each having a drive connection, wherein the drive connection of at least one inverter switching element is connected to the driver circuit via a first switching element of the protective circuit, wherein a drive connection of the first switching element is connected to a circuit node, which is connected to a first potential via a resistor and to a second potential via a second switching element, wherein the protective circuit includes a comparison device having an input which connected to an operating voltage and a reference voltage and an output connected to a drive connection of the second switching element, so that if the operating voltage deviates from the reference voltage, the second switching element is switched and the first switching element is switched due to one of the first potential or the second potential being applied to the circuit node as a result of the switching of the second switching element.

2. The electrical circuit arrangement according to claim 1, wherein the circuit node is connected to a drive connection of a third switching element, wherein the third switching element connects the first potential to the drive connection of the at least one inverter switching element.

3. The electrical circuit arrangement according to claim 2, wherein application of the first potential to the drive connection of the at least one inverter switching element causes the at least one inverter switching element to close.

4. The electrical circuit arrangement according to claim 1, wherein the inverter includes a half-bridge having one of the inverter switching elements as a high-side switch and another of the inverter switching elements as a low-side switch, wherein the drive connections of the low-side switches is connected to the driver circuit via the first switching element, wherein the drive connections of the first switching element is connected to the circuit node.

5. The electrical circuit arrangement according to claim 1, wherein the comparison device is a comparator.

6. The electrical circuit arrangement according to claim 1, wherein the output of the comparison device is connected to a switch-off connection of the driver circuit.

7. The electrical circuit arrangement according to claim 1, wherein the operating voltage is a DC voltage connected to a DC voltage side of the inverter.

8. A drive arrangement for driving a motor vehicle, comprising:
an electric drive machine; and
an electrical circuit arrangement connected to the electric drive machine, the electrical circuit arrangement including:
an inverter including a plurality of inverter switching elements each having a drive connection;
a driver circuit; and
a protective circuit including a first switching element, a second switching element, and a comparison device;
wherein the drive connection of at least one inverter switching element is connected to the driver circuit via the first switching element;
wherein a drive connection of the first switching element is connected to a circuit node, which is connected to a first potential resistor and to a second potential via the second switching element;
wherein the comparison device includes an input connected to an operating voltage and a reference voltage and an output connected to a drive connection of the second switching element;
wherein the second switch element is configured to be switched based on the operating voltage deviating from the reference voltage,
wherein the first switching element is configured to be switched based on one of the first potential or the second potential being applied to the circuit node as a result of the switching of the second switching element.

9. The electrical circuit arrangement according to claim 1, wherein the second switching element is switched to an opened state based on the operating voltage being less than the reference voltage.

10. The electrical circuit arrangement according to claim 9, wherein the first potential is applied to the circuit node when the second switching element is in the opened state.

11. The electrical circuit arrangement according to claim 10, wherein the first switching element is switched to a closed state based on the first potential being applied to the circuit node.

12. The electrical circuit arrangement according to claim 1, wherein the second switching element is switched to a closed state based on the operating voltage being greater than the reference voltage.

13. The electrical circuit arrangement according to claim 12, wherein the second potential is applied to the circuit node when the second switching element is in the closed state.

14. The electrical circuit arrangement according to claim 13, wherein the first switching element is switched to an opened state based on the second potential being applied to the circuit node.

15. The electrical circuit arrangement according to claim 6, wherein the driver circuit is switched-off via the switch-off connection based on the operating voltage being greater than the reference voltage.

16. The electrical circuit arrangement according to claim 1, wherein the first potential is greater than the second potential.

17. The electrical circuit arrangement according to claim 1, wherein the comparison device is configured to:
   output a third potential based on the operating voltage being greater than the reference voltage; and
   output a fourth potential based on the operating voltage being less than the reference voltage, wherein the fourth potential is less than the third potential.

18. The electrical circuit arrangement according to claim 17, wherein the third potential is equal to the first potential.

19. The drive arrangement according to claim 8, wherein the circuit node is connected to a drive connection of a third switching element, wherein the third switching element connects the first potential to the drive connection of the at least one inverter switching element.

20. The drive arrangement according to claim 19, wherein application of the first potential to the drive connection of the at least one inverter switching element causes the at least one inverter switching element to close.

\* \* \* \* \*